United States Patent
Kim et al.

(10) Patent No.: US 8,670,002 B2
(45) Date of Patent: Mar. 11, 2014

(54) PORTABLE ELECTRONIC DEVICE ADAPTED TO CHANGE OPERATION MODE

(75) Inventors: Dong-Kyun Kim, Seoul (KR);
Joon-Suh Kim, Anyang-si (KR);
Gee-Hong Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1135 days.

(21) Appl. No.: 12/104,784

(22) Filed: Apr. 17, 2008

(65) Prior Publication Data

US 2008/0259094 A1    Oct. 23, 2008

(30) Foreign Application Priority Data

Apr. 18, 2007    (KR) .................... 10-2007-0038028

(51) Int. Cl.
| | |
|---|---|
| *G09G 5/00* | (2006.01) |
| *G06T 3/60* | (2006.01) |
| *G06T 11/60* | (2006.01) |
| *G06F 3/01* | (2006.01) |
| *G06F 3/038* | (2013.01) |
| *G06F 3/0338* | (2013.01) |

(52) U.S. Cl.
CPC ............ *G06T 3/606* (2013.01); *G06T 3/602* (2013.01); *G06T 11/60* (2013.01); *G06F 3/016* (2013.01); *G06F 3/011* (2013.01); *G06F 3/038* (2013.01); *G06F 3/0338* (2013.01)
USPC ............ 345/658; 345/659; 345/649; 345/650; 345/655; 345/656; 345/156; 345/157; 345/158

(58) Field of Classification Search
CPC ......... G06T 3/606; G06T 3/602; G06T 11/60; G06F 3/016; G06F 3/011; G06F 3/038; G06F 3/0338
USPC ............... 345/156–158, 649–659; 455/550.1, 455/556.1, 575, 575.1
See application file for complete search history.

(56) References Cited

U.S. PATENT DOCUMENTS

| | | | |
|---|---|---|---|
| 2002/0021278 A1* | 2/2002 | Hinckley et al. .............. | 345/156 |
| 2003/0153372 A1* | 8/2003 | Shimamura et al. .......... | 455/575 |
| 2004/0067783 A1* | 4/2004 | Lenchik et al. ............ | 455/575.1 |
| 2004/0125092 A1* | 7/2004 | Kinerk et al. ................. | 345/204 |
| 2004/0127267 A1* | 7/2004 | Wong et al. ................ | 455/575.1 |

(Continued)

FOREIGN PATENT DOCUMENTS

| | | |
|---|---|---|
| DE | 10147480 | 5/2003 |
| KR | 1020060056446 | 5/2006 |

(Continued)

OTHER PUBLICATIONS

European Search Report dated Aug. 19, 2008.

*Primary Examiner* — Jin-Cheng Wang
(74) *Attorney, Agent, or Firm* — H.C. Park & Associates, PLC

(57) ABSTRACT

A portable electronic device adapted to change its operation mode is disclosed. When a rotation of the portable electronic device is detected, the operation mode is changed according to the angle of rotation, and a user interface corresponding to the changed operation mode is output by a display unit. This method intuitively changes the mode based on a rotation of the device without requiring a complicated and unnecessary key input, and provides a more convenient and faster user interface.

14 Claims, 8 Drawing Sheets

(56) References Cited

U.S. PATENT DOCUMENTS

| | | | |
|---|---|---|---|
| 2004/0203520 A1* | 10/2004 | Schirtzinger et al. | 455/90.3 |
| 2005/0062715 A1* | 3/2005 | Tsuji et al. | 345/158 |
| 2005/0090288 A1* | 4/2005 | Stohr et al. | 455/566 |
| 2005/0091431 A1* | 4/2005 | Olodort et al. | 710/72 |
| 2005/0125570 A1* | 6/2005 | Olodort et al. | 710/15 |
| 2006/0111093 A1* | 5/2006 | Shim et al. | 455/418 |
| 2007/0004451 A1* | 1/2007 | Anderson | 455/556.1 |
| 2007/0036348 A1 | 2/2007 | Orr | |
| 2007/0111750 A1* | 5/2007 | Stohr et al. | 455/550.1 |
| 2007/0120838 A1* | 5/2007 | Kinerk et al. | 345/184 |
| 2007/0123309 A1* | 5/2007 | Sano et al. | 455/566 |
| 2007/0157089 A1* | 7/2007 | Van Os et al. | 715/702 |
| 2007/0252853 A1* | 11/2007 | Park et al. | 345/649 |
| 2008/0102882 A1* | 5/2008 | Sutardja | 455/550.1 |

FOREIGN PATENT DOCUMENTS

| | | |
|---|---|---|
| KR | 100640448 | 10/2006 |
| KR | 1020060127303 | 12/2006 |
| KR | 1020070025604 | 3/2007 |
| WO | 0123985 | 4/2001 |

* cited by examiner

PORTABLE ELECTRONIC DEVICE ADAPTED TO CHANGE OPERATION MODE

CROSS REFERENCE TO RELATED APPLICATION

This application claims priority from and the benefit of Korean Patent Application No. 10-2007-0038028, filed Apr. 18, 2007, which is hereby incorporated by reference for all purposes as if fully set forth herein.

BACKGROUND OF THE INVENTION

1. Field of the Invention

The present invention relates to a portable electronic device, and more particularly to a portable electronic device adapted to change its operation mode.

2. Discussion of the Background

Recently, portable electronic devices having a rotatable display unit have drawn attention. Such portable electronic devices have a motion-detecting sensor to detect the rotation of the display unit. When rotation of the display unit is detected, still or moving images are converted according to the changed ratio of the display unit. A conventional portable electronic device having a rotatable display unit will now be described in more detail with reference to FIG. 1.

Referring to FIG. 1, a conventional portable electronic device employs an accelerometer sensor and a gyro sensor to detect the rotation of a display unit. Upon detecting a rotation of the display unit, the portable electronic device changes the horizontal/vertical ratio of still or moving images according to the ratio of the display unit. However, the angle of rotation of the display unit of the conventional portable electronic device is limited to −90°. This means that the portable electronic device can merely change the size and ratio of still or moving images based on the rotation of the display unit.

However, changing the mode of conventional portable electronic devices often requires a large amount of key input. In other words, it takes much effort and time to change the mode of conventional portable electronic devices, because they lack consideration of a more flexible and convenient user interface.

In summary, conventional portable electronic devices have limited functions based on the rotation of the display unit and that the mode change requires a large amount of key input.

SUMMARY OF THE INVENTION

The present invention provides a portable electronic device adapted to change its operation mode so that a simpler and more convenient user interface may be provided.

Additional features of the invention will be set forth in the description which follows, and in part will be apparent from the description, or may be learned by practice of the invention.

The present invention discloses a portable electronic device adapted to change an operation mode, including an operation mode identifier display unit to display an operation mode identifier which stands erect according to a rotation of the portable electronic device, a sensor unit to detect rotation of the portable electronic device, and a control unit to switch to an operation mode corresponding to the operation mode identifier which stands erect according to an angle of the rotation of the portable electronic device when a rotation of the portable electronic device has been detected by the sensor unit.

It is to be understood that both the foregoing general description and following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
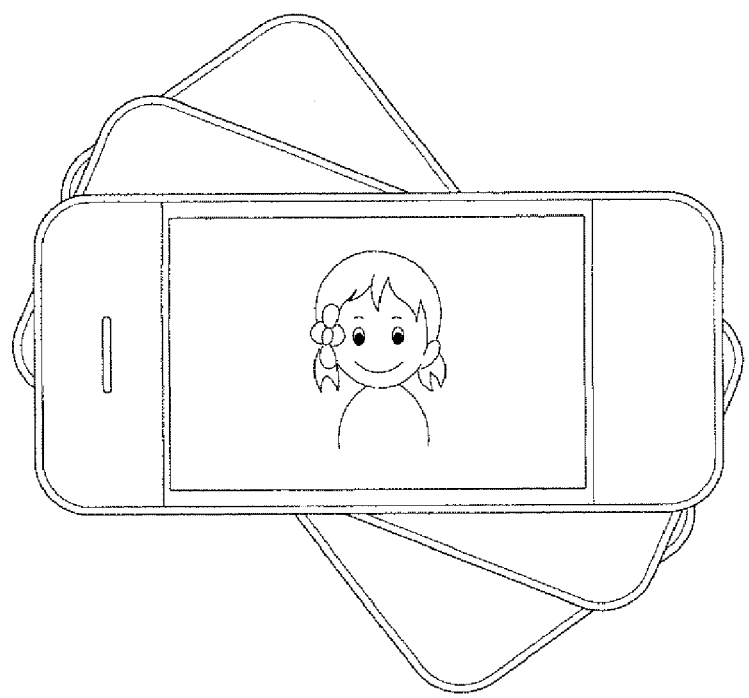
FIG. 1 shows a rotatable display unit of a conventional portable electronic device.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Exemplary embodiments of the present invention disclose a portable electronic device adapted to change its operation mode. More particularly, a portable electronic device according to exemplary embodiments of the present invention may detect a rotation of the portable electronic device, switch to an operation mode corresponding to the angle of rotation, and display a user interface corresponding to the operation mode via a display unit. By changing the mode intuitively according to the rotation of the portable electronic device, this method minimizes the amount of necessary key input and provides a more convenient and faster user interface.

Referring to FIG. 2A, FIG. 2B, FIG. 2C, FIG. 2D, FIG. 2E and FIG. 3, the portable electronic device includes a display unit 330, operation mode identifier display units 10, 20, 30, and 40 to display operation mode identifiers, and a hold unit 50 to hold the mode change. According to an exemplary embodiment of the present invention, the display unit 330 may consist of a touch screen. In this case, the display unit 330 may display a key input unit 340, a menu icon, etc. The operation mode identifiers (hereinafter, abbreviated as identifiers) refer to icons representing respective operation modes (hereinafter, abbreviated as modes), including a telephone mode, a digital multimedia broadcasting (DMB) mode, an Internet mode, and a game mode, according to an exemplary embodiment of the present invention.

The operation mode identifier display units 10, 20, 30, and 40 are positioned at the center of lower, right, upper, and left edges of the display unit 330, respectively, when viewed in front of the portable electronic device, and display corresponding identifiers. Although four identifiers are displayed by the operation mode identifier display units 10, 20, 30, and 40 according to the present exemplary embodiment, a single identifier may be displayed on one of the four edges. Alternatively, identifiers may be displayed on two edges facing each other in the vertical or horizontal direction. As such, the number of identifiers displayed by the identifier display units 10, 20, 30, and 40 may vary.

Figures 2A, 2B, 2C:
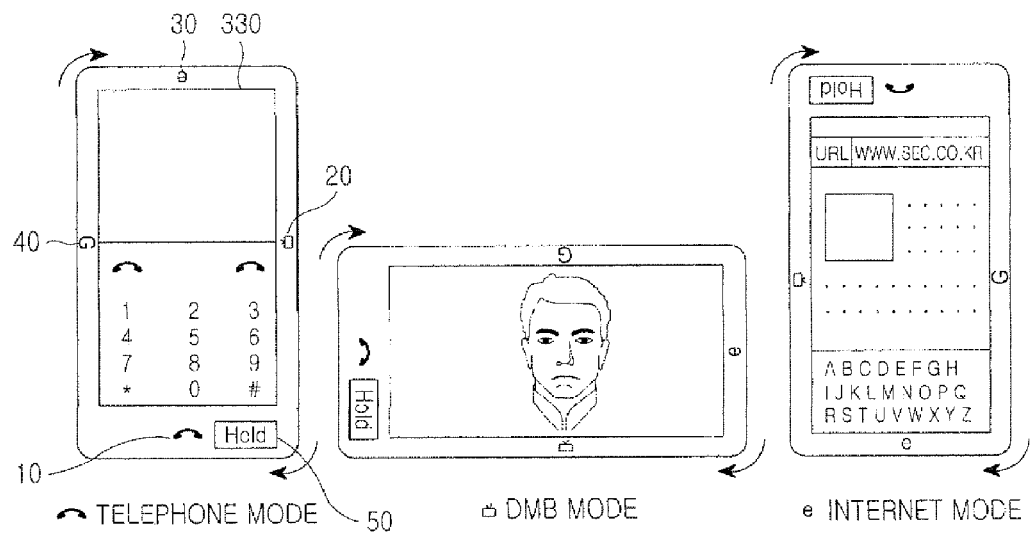
FIG. 2A, FIG. 2B, FIG. 2C, FIG. 2D, and FIG. 2E are front views of a portable electronic device according to an exemplary embodiment of the present invention.
Figures 2D, 2E:
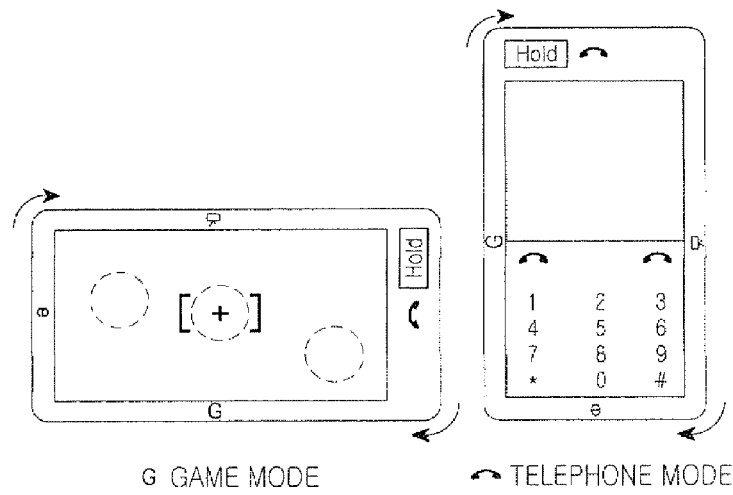

The portable electronic device, which is constructed as described above, detects an identifier which stands erect as a result of its rotation, and switches to a mode corresponding to the detected identifier. More particularly a telephone mode identifier stands erect, as shown in FIG. 2A, and the portable electronic device operates in a telephone mode. Similarly, a DMB mode, an Internet mode, and a game mode are established in FIG. 2B, FIG. 2C, and FIG. 2D, respectively, and the portable electronic device switches to the mode corresponding to the identifier. Although the identifier which stands erect may be positioned below the display unit 330, it may also be positioned above the display unit 330 in terms of the display direction. This means that, when the identifier stands erect towards the center of the portable electronic device and displayed accordingly as shown in FIG. 2A, FIG. 2B, FIG. 2C, and FIG. 2D, the identifier which stands erect is displayed by the identifier display unit positioned below the display unit 330, as viewed by the user. However, as shown in FIG. 2E, if the identifier stands erect opposite to the center of the portable electronic device and is displayed accordingly as shown in (e) of FIG. 2E, the identifier which stands erect is positioned above the display unit 330.

This construction enables the user to rotate the portable electronic device so that the identifier of the desired mode is positioned above or below the display unit 330. This means that the user may be able to select a desired mode more intuitively. In addition, the user may operate the hold unit 50 to hold or release the operation mode.

Figure 3:
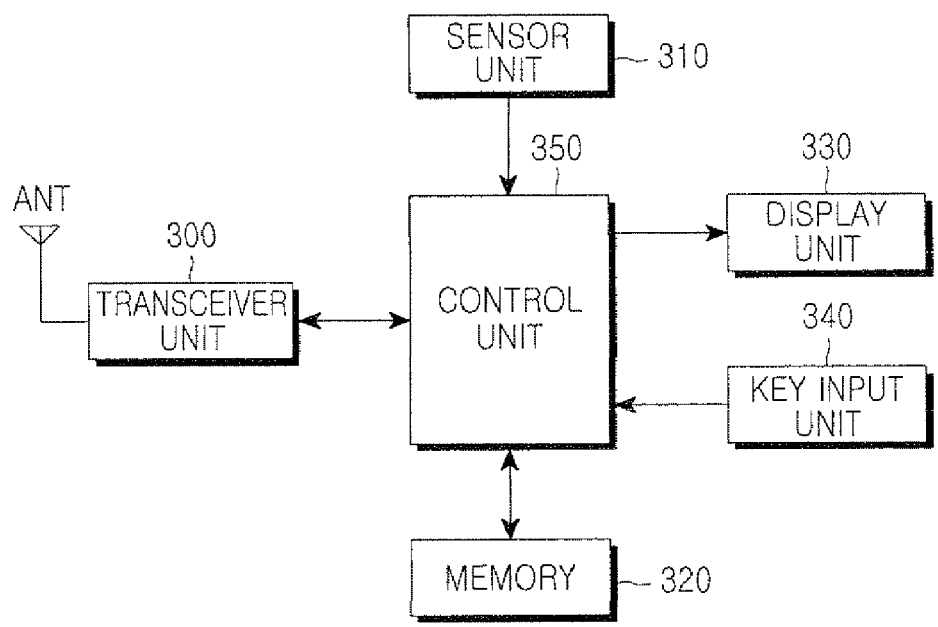
FIG. 3 is a block diagram showing a portable electronic device according to an exemplary embodiment of the present invention.

A portable electronic device according to an exemplary embodiment of the present invention will now be described with reference to FIG. 3. Referring to FIG. 3, the portable electronic device (when configured as a communication device) includes a transceiver unit 300, a sensor unit 310, a memory 320, a display unit 330, a key input unit 340, and a control unit 350. The transceiver unit 300 incorporates a wireless communication function when the portable electronic device is a communication device. The sensor unit 310 detects rotation of the display unit 330 and calculates the angle of rotation. According to the present exemplary embodiment, the display unit 330 consists of a touch screen, which provides the key input unit 340 and the display unit. For this reason, rotation of the portable electronic device corresponds to that of the display unit 330. Therefore, it will be assumed in the following description that the rotation of the display unit 330 and that of the portable electronic device have the same meaning.

The memory 320 may include ROMs and RAMs to store a number of programs and data. Particularly, according to the present exemplary embodiment, the memory 320 stores a user interface of a mode corresponding to the calculated angle. In addition, the memory 320 stores first and second threshold values, which are used as reference values to prevent a mode change caused by an unwanted rotation of the display unit 330.

The display unit 330 receives an input of display data regarding key input data from the key input unit 340 and displays it under the control of the control unit 350. In addition, the display unit 330 displays the operating condition of the portable electronic device and various types of information using icons and characters. The key input unit 340 provides a user interface and includes various function keys, numeric keys (0-9), and special keys (*, #) so that key input data from the user is output to the control unit 350. According to the present exemplary embodiment, the key input unit 340 includes key buttons on the display unit 330, which is a touch screen, and receives a key input from the user.

When the sensor unit 310 detects rotation of the display unit 330, the control unit 350 detects an identifier which stands erect according to the rotation of the display unit 330 and conducts a mode change based on the detected identifier. When the user operates the hold unit 50 to hold a specific mode, the control unit 350 does not change the mode until the hold is released, even if the portable electronic device is rotated.

Figure 4:
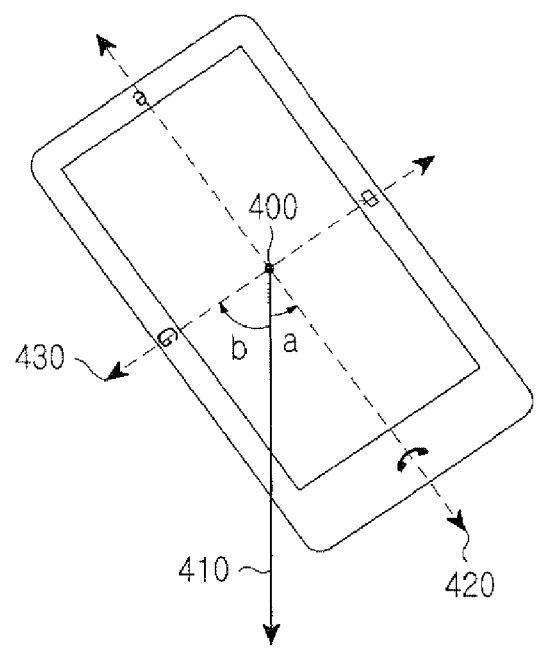
FIG. 4 shows a method for determining an operation mode based on the angle of rotation of a portable electronic device according to an exemplary embodiment of the present invention.

A method for determining an operation mode based on the angle of rotation of the portable electronic device will now be described with reference to FIG. 4. Referring to FIG. 4, the control unit 350 calculates the angle between a vertical line 410 extending downwards from the central point 400 of the portable electronic device (hereinafter, referred to as a reference line) and a line 420 passing through an operation mode identifier display unit positioned on each edge of the display unit 330. Then, the control unit 350 determines which identifier has the smallest included angle and switches to a mode corresponding to the determined identifier. In the case of FIG. 4, the included angle a between the reference line 410 and a line 420 passing through the telephone mode identifier is smaller than the included angle b between the reference line 410 and a line 430 passing through the game mode identifier. Therefore, the portable electronic device operates in the telephone mode.

Control steps for switching to a corresponding operation mode based on the rotation of a portable electronic device according to an exemplary embodiment of the present invention will now be described with reference to FIG. 5.

Figure 5:
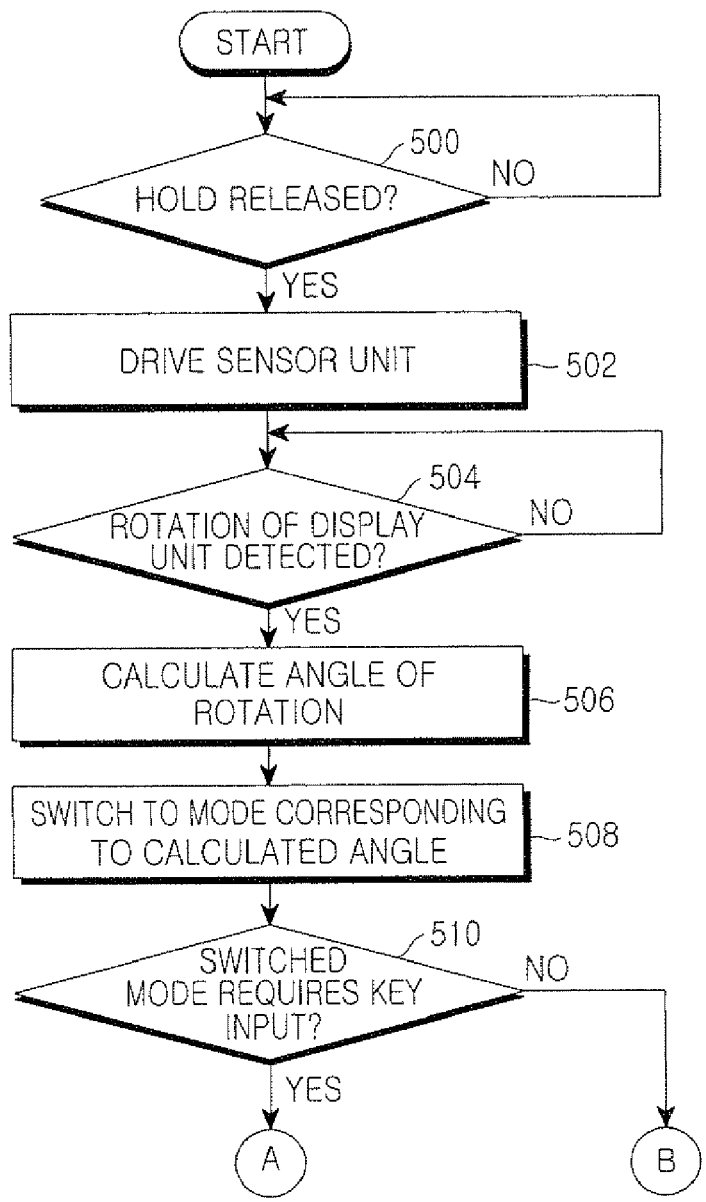
FIG. 5 is a flowchart showing control steps for switching to a corresponding operation mode based on a rotation of a portable electronic device according to an exemplary embodiment of the present invention.

Referring to FIG. 5, the control unit 350 determines whether or not a hold has been released (500). Particularly, the control unit 350 confirms if a hold has been established by the hold unit 50. If a hold has been established, the control unit 350 maintains the current mode. If the hold has been released, the control unit 350 drives the sensor unit 310 (502). Then, the control unit 350 determines if rotation of the display unit 330 is detected (504). When rotation of the display unit 330 is detected, the control unit 350 proceeds to calculate the angle of rotation (560) in the same way as discussed with regard to FIG. 4. For example, the angle of rotation may be one of 0, 90°, 180°, and 270°. The control unit 350 then switches to a mode corresponding to the angle calculated (508).

When the user continues an operation in a changed mode without establishing a hold, the control unit 350 should maintain the mode even if an instantaneous rotation occurs unexpectedly. To this end, after switching to a mode corresponding to the angle calculated in step 508, the control unit 350 determines whether or not the changed mode requires a key input (510). As used herein, a mode requiring a key input (hereinafter, referred to as a key input mode) refers to a mode requiring an input made via character keys or numeric keys, such as a telephone mode, an Internet mode, a text message mode, or a game mode. In contrast, a mode requiring no key input (hereinafter, referred to as a no-key-input mode) refers to a mode requiring neither character keys nor numeric keys, but using operations keys, such as a mode for playing moving images, MP3 files, or DMB.

Figure 6:
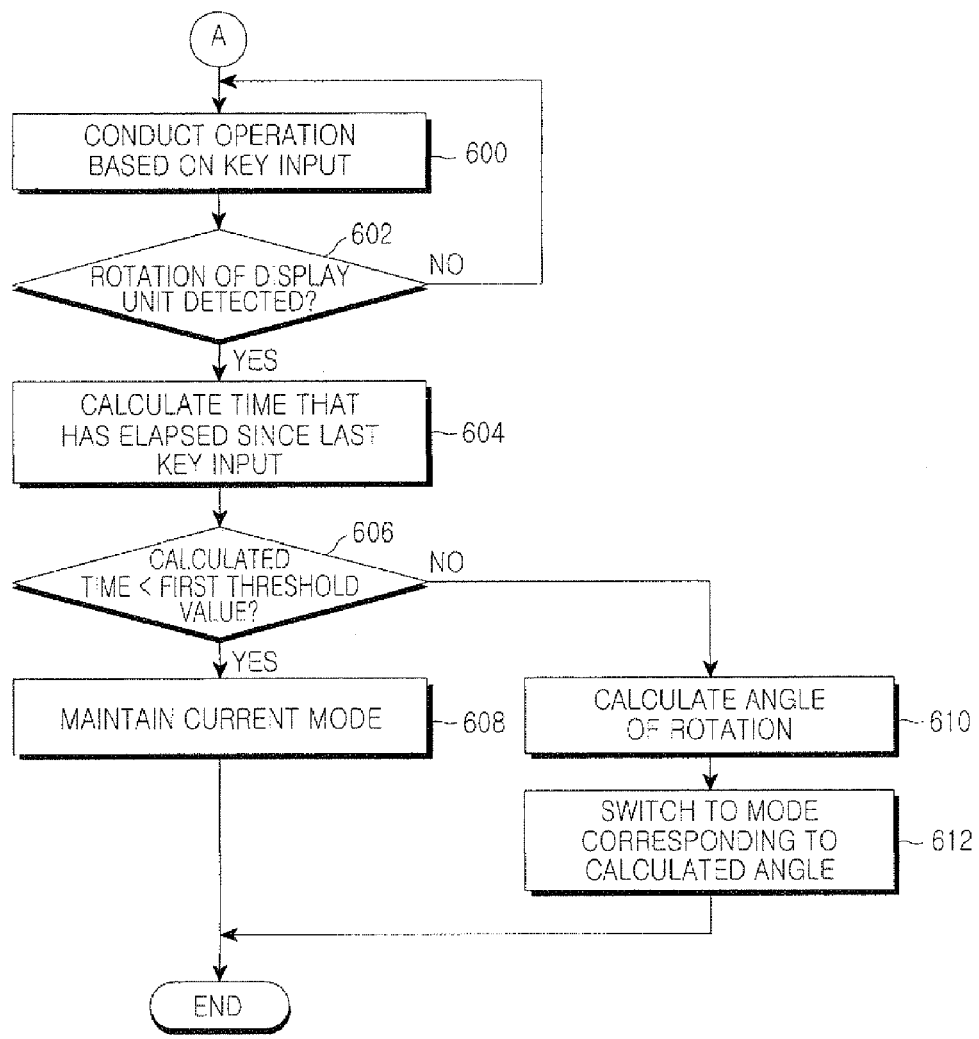
FIG. 6 is a flowchart showing control steps conducted in response to a rotation of a display unit in a key input mode according to an exemplary embodiment of the present invention.
Figure 7:
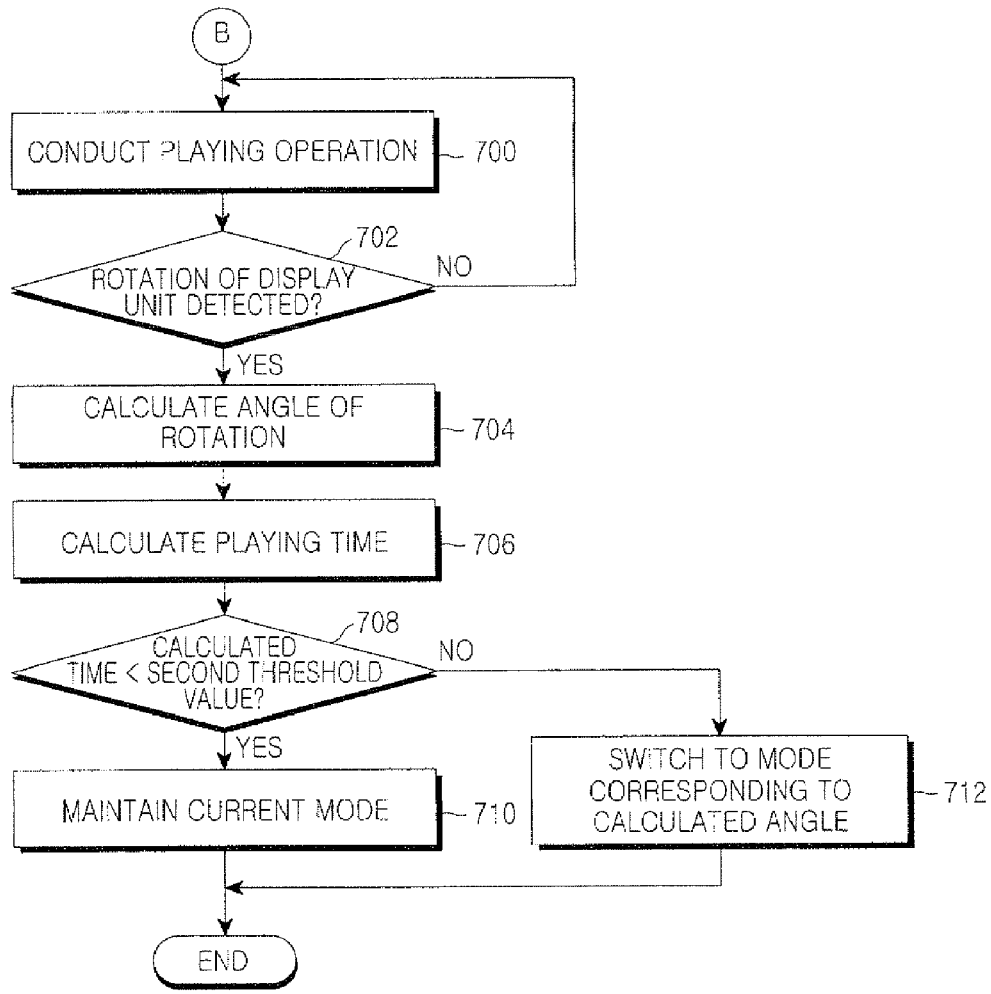
FIG. 7 is a flowchart showing control steps conducted in response to a rotation of a display unit in a no-key-input mode according to an exemplary embodiment of the present invention.

Upon switching to a key input mode, the control unit 350 proceeds to step 600 shown in FIG. 6 but, upon switching to a no-key-input mode, proceeds to step 700 shown in FIG. 7. Reference numeral A shown in FIG. 5 indicates that step 510 in FIG. 5 is followed by step 600 in FIG. 6, and reference numeral B similarly indicates that step 510 in FIG. 5 is followed by step 700 in FIG. 7.

Control steps conducted in response to a rotation of the display unit in a key input mode, which follow step 510 described with regard to FIG. 5, will now be described with reference to FIG. 6.

Referring to FIG. 6, after confirming a key input mode, the control unit 350 conducts an operation based on the key input (600). Then, the control unit 350 determines if rotation of the display unit 330 is detected (602). If no rotation is detected, the process returns to the previous step (600).

If rotation of the display unit 330 is detected, the control unit 350 calculates how long time has passed since the last key input (604). The control unit 350 decides whether or not the period of time calculated in step 604 is shorter than a first threshold value (606). As used herein, the first threshold value refers to the maximum period of time to wait for a key input, i.e. how long the control unit 350 can receive a key input from the user and process it effectively. If a key input is made during this period of time, the control unit 350 determines that the user wishes to continue an operation in the corresponding mode. This is for the purpose of preventing a mode change caused by an unwanted movement of the user and the resulting rotation of the display unit 330. As such, if the calculated period of time is shorter than the first threshold value, the control unit 350 determines that the user wishes to continue an operation in the currents mode and maintains the current mode (608). If the calculated period of time is longer than the first threshold value, the control unit 350 determines that the user has finished the operation in the current mode. Then, the control unit 350 calculates the angle of rotation in step 610, and switches to a mode corresponding to the calculated angle (612).

In summary, the control unit 350 may be able to determine whether or not rotation of the display unit 330 has been intended for a mode switch by calculating the time that has elapsed since the last key input in a key input mode.

Control steps conducted in response to a rotation of the display unit in a no-key-input mode, which follow step 510 described with regard to FIG. 5, will now be described with reference to FIG. 7.

Referring to FIG. 7, after confirming a no-key-input mode (i.e. playing mode), the control unit 350 conducts a playing operation (700). In the playing mode, DMB, for example, moving images, or MP3 files may be played.

The control unit 350 decides if rotation of the display unit 330 is detected (702). If so, the control unit 350 proceeds to step 704. If no rotation sufficient for a mode change has been detected, the control unit 350 returns to the beginning and conducts a playing operation.

When rotation of the portable electronic device is detected, the control unit 350 calculates the angle of rotation (704). The control unit 350 calculates the playing time in the playing mode (706), and determines if the playing time is shorter than a second threshold value (708). As used herein, the second threshold value refers to a reference period of time for which the display unit 330 maintains a corresponding angle for a mode change. If the playing time is shorter than the second threshold value, the control unit 350 maintains the current mode (710). If the playing time is longer than the second threshold value, the control unit 350 maintains the original mode for a predetermined period of time. Then, the control unit 350 switches to a mode corresponding to the calculated angle (712).

Even when the mode is fixed, the user may easily change the mode by operating the hold unit or by keeping the portable electronic device rotated for an extended period of time.

As mentioned above, exemplary embodiments of the present invention not only change the mode easily based on a rotation of the display unit (i.e. rotation of the portable electronic device), but also enable the user to select a desired mode more easily. According to an alternative exemplary embodiment of the present invention, when an event (e.g. an incoming call, the arrival of a message, or an alarm) occurs in a mode, the portable electronic device suspends the current mode and processes the event. The portable electronic device returns to the original mode after the event is over, which will now be described in detail with reference to FIG. 8.

Figure 8:
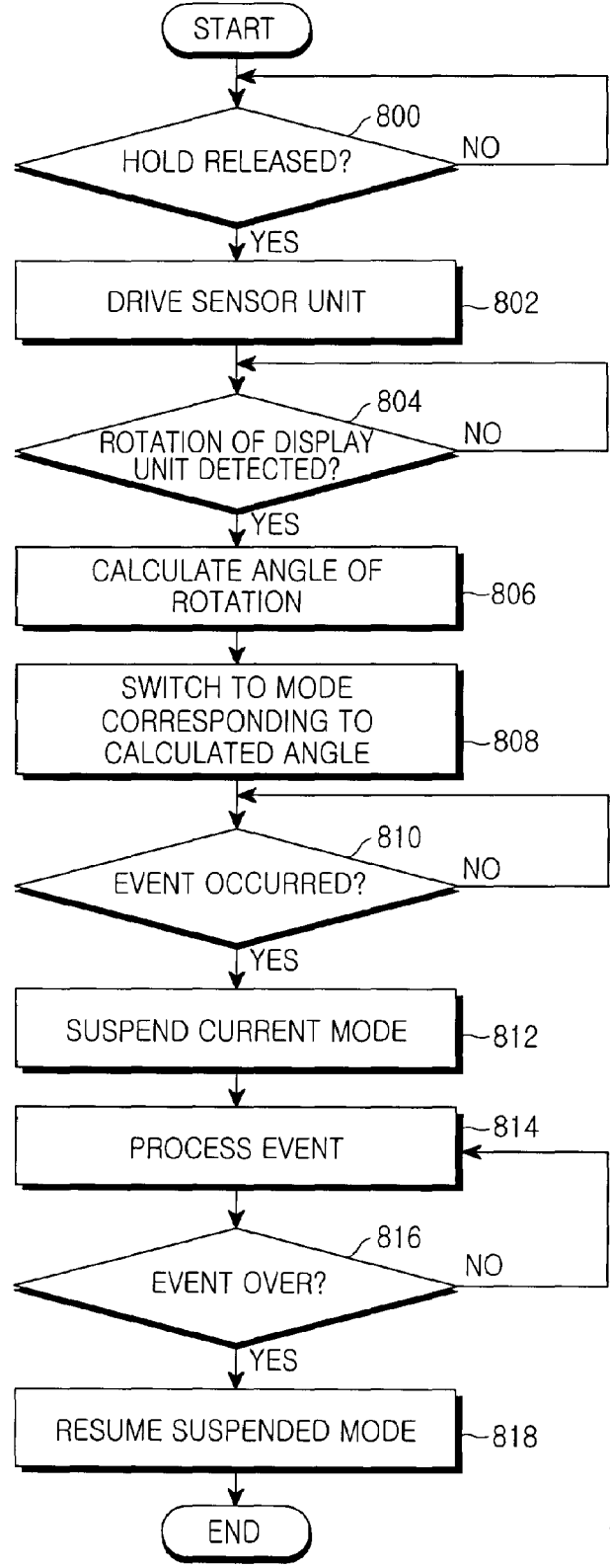
FIG. 8 is a flowchart showing control steps for processing an event occurring in a mode according to an exemplary embodiment of the present invention.

FIG. 8 is a flowchart showing control steps for processing an event occurring in a mode according to an exemplary embodiment of the present invention. Referring to FIG. 8, the control unit 350 determines if a hold has been released (800). If so, the control unit 350 drives the sensor unit 310 (802). Then, the control unit 350 determines if rotation of the display unit 330 is detected (804).

If a rotation of the display unit 330 is detected, the control unit 850 calculates the angle of rotation (806), and switches to a mode corresponding to the calculated angle (808). After the mode change, the control unit 350 determines if an event has occurred (810). As used herein, the event may include an incoming call, the arrival of a message, and an alarm. If an event has occurred, the control unit 350 suspends the current mode (812) and processes the event (814). Then, the control unit 350 determines if the event is over (816). If so, the control unit 350 resumes the suspended mode (818). If the event has not ended, the control unit 350 returns to the previous step (814) and processes the event.

As mentioned above, the exemplary embodiments of the present invention change the mode of a portable electronic device according to its rotation so that the resulting user interface, which may be intuitive and easy to recognize, may improve user convenience and the aesthetics of the device.

In addition, exemplary embodiments of the present invention enable the user to change the operation mode by rotating the portable electronic device with reference to the operation mode identifiers. This may minimize the amount of key input and provide a more intuitive and faster user interface.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A portable electronic device adapted to change an operation mode, comprising:
    a display unit configured to display a user interface corresponding to a plurality of operation modes according to a rotation of the portable electronic device;
    an operation mode identifier display unit configured to display a plurality of operation mode identifiers indicating that the user interface is displayed in the plurality of operation modes, respectively, locations of the operation mode identifiers being fixed on the portable electronic device;
    a sensor unit configured to detect the rotation of the portable electronic device; and
    a control unit configured to determine which one of the plurality of operation mode identifiers is presented upright relative to a viewpoint of a user in response to detecting the rotation of the portable electronic device and to switch to one of the plurality of operation modes corresponding to the operation mode identifier determined as presented upright,
    wherein the plurality of operation mode identifiers are positioned on an upper edge, a lower edge, a left edge, and a right edge of the display unit, respectively, and only the one of the plurality of operation mode identifiers is presented upright relative to the viewpoint of the user in the corresponding one of the plurality of operation modes.

2. The portable electronic device of claim 1, wherein each of the operation mode identifiers stands in a direction opposite to a central point of the portable electronic device.

3. The portable electronic device of claim 1, wherein the plurality of operation modes comprise a telephone mode, an Internet mode, a digital multimedia broadcasting mode, and a game mode.

4. The portable electronic device of claim 1, further comprising a hold unit to hold or release the one of the plurality of operation modes.

5. The portable electronic device of claim 1, wherein the plurality of operation mode identifiers are icons corresponding to the plurality of operation modes.

6. The portable electronic device of claim 1,
    wherein the control unit is further configured to determine a first angle between a reference line and a first line passing through a first operation mode identifier and a second angle between the reference line and a second line passing through a second operation mode identifier, to compare the first angle with the second angle, and to switch to an operation mode corresponding the first operation mode identifier in response to determining that the first angle is smaller than the second angle, the first operation mode identifier and the second operation mode identifier constituting the plurality of operation mode.

7. The portable electronic device of claim 6, wherein the control unit is adapted to compare a period of time measured since a last key input with a first threshold value when the operation mode is a mode requiring a key input and to maintain the operation mode in response to the rotation of the portable device when the period of time is shorter than the first threshold value.

8. The portable electronic device of claim 6, wherein the control unit is adapted to compare a playing time in a playing mode with a second threshold value when the operation mode is a playing mode and to maintain the operation mode in response to the rotation of the portable device when the playing time is longer than the second threshold value.

9. The portable electronic device of claim 6, wherein the control unit is adapted to suspend the operation mode when an event has occurred and to resume the suspended operation mode after the event is over.

10. The portable electronic device of claim 6, wherein the reference line is a vertical line extending downwards from a central point of the portable electronic device.

11. A portable electronic device, comprising:
    a display unit configured to display a graphic user interface according to a plurality of operation modes;
    a first icon disposed at a upper side of the display unit, the first icon indicating that a first graphic user interface is displayed in a first operation mode;
    a second icon disposed at a lower side of the display unit, the second icon indicating that a second graphic user interface is displayed in a second operation mode;
    a third icon disposed at a left side of the display unit, the third icon indicating that a third graphic user interface is displayed in a third operation mode;
    a fourth icon disposed at a right side of the display unit, the fourth icon indicating that a fourth graphic user interface is displayed in a fourth operation mode;
    a sensor unit configured to detect a rotation of the portable electronic device; and
    a control unit configured to determine which one of the first to fourth icons is presented upright relative to a viewpoint of a user in response to detecting the rotation of the portable electronic device and to switch to one of the first to fourth operation modes corresponding to the one of the first to fourth icons determined as presented upright,
    wherein only the one of the first to fourth icons is presented upright relative to the viewpoint of the user in the corresponding one of the first to fourth operation modes.

12. The portable electronic device of claim 11,
    wherein the control unit is further configured to switch the portable electronic device from the first operation mode to the second operation mode when a first angle between a reference line and a first line intersecting the first icon from a central portion of the portable electronic device is greater than a second angle between the reference line and a second line intersecting the second icon from the central portion of the portable electronic device, the first graphic user interface and the second graphic user interface being aligned with the first line and the second line, respectively,
    wherein the control unit is further configured to switch the portable electronic device from the second operation mode to the third operation mode when the second angle between the reference line and the second line intersecting the second icon from the central portion of the portable electronic device is greater than a third angle between the reference line and a third line intersecting the third icon from the central portion of the portable electronic device, and the control unit switches the portable electronic device from the third operation mode to the fourth operation mode when the third angle between the reference line and the third line intersecting the third icon from the central portion of the portable electronic device is greater than a fourth angle between the reference line and a fourth line intersecting the fourth icon from the central portion of the portable electronic device,
    wherein the display unit is further configured to display the third graphic user interface corresponding to the third operation mode in response to the control unit switching the portable electronic device to the third operation mode, and the display unit displays the fourth graphic user interface corresponding to the fourth operation mode in response to the control unit switching the portable electronic device to the fourth operation mode, and wherein the display unit is further configured to display the third graphic user interface in the third operation mode and to display the fourth graphic user interface in the fourth operation mode, the third graphic user interface and the fourth graphic user interface being aligned with the third line and the fourth line, respectively.

13. The portable electronic device of claim 12, wherein the first line and the third line are the same line, the second line and the fourth line are the same line, and the reference line intersects with the first line and the third line at the central portion of the portable electronic device.

14. The portable electronic device of claim 11, wherein the first to fourth icons are positioned on an upper edge, a lower edge, a left edge, and a right edge of the display unit, respectively.

* * * * *